United States Patent
Mayer et al.

(10) Patent No.: US 11,099,271 B2
(45) Date of Patent: Aug. 24, 2021

(54) METHOD FOR OPERATING A FIRST RADAR SUB-SENSOR AND A SECOND RADAR SUB-SENSOR, AND RADAR SENSOR SYSTEM INCLUDING A FIRST RADAR SUB-SENSOR AND A SECOND RADAR SUB-SENSOR

(71) Applicant: Robert Bosch GmbH, Stuttgart (DE)

(72) Inventors: Marcel Mayer, Lonsee (DE); Klaus Baur, Mietingen (DE); Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 296 days.

(21) Appl. No.: 16/378,911

(22) Filed: Apr. 9, 2019

(65) Prior Publication Data

US 2019/0331787 A1    Oct. 31, 2019

(30) Foreign Application Priority Data

Apr. 27, 2018  (DE) .......................... 102018206532.2

(51) Int. Cl.
*G01S 13/87* (2006.01)
*G01S 7/41* (2006.01)
*G01S 7/02* (2006.01)

(52) U.S. Cl.
CPC .............. *G01S 13/87* (2013.01); *G01S 7/023* (2013.01); *G01S 7/41* (2013.01)

(58) Field of Classification Search
CPC .................................. G01S 13/87; G01S 7/023
See application file for complete search history.

(56) References Cited

U.S. PATENT DOCUMENTS

| | | | |
|---|---|---|---|
| 7,012,560 B2* | 3/2006 | Braeuchle ............. | G01S 13/865 342/70 |
| 2008/0084346 A1* | 4/2008 | Minichshofer ....... | G01S 7/2813 342/118 |
| 2008/0278370 A1* | 11/2008 | Lachner .................... | G01S 7/03 342/200 |
| 2009/0251356 A1* | 10/2009 | Margomenos ....... | H01Q 21/064 342/70 |
| 2013/0257643 A1* | 10/2013 | Inomata .................. | G01S 7/023 342/70 |
| 2016/0131740 A1* | 5/2016 | Yoo ........................ | G01S 7/4004 342/70 |
| 2017/0153315 A1* | 6/2017 | Katayama ............... | G01S 13/93 |
| 2018/0149735 A1* | 5/2018 | Lim ...................... | G01S 13/931 |
| 2018/0284258 A1* | 10/2018 | Roger .................... | G01S 13/931 |
| 2019/0056477 A1* | 2/2019 | Jonas ..................... | G01S 7/023 |
| 2019/0086509 A1* | 3/2019 | Bilik ........................ | G01S 13/87 |
| 2019/0331787 A1* | 10/2019 | Mayer ..................... | G01S 7/023 |
| 2021/0072364 A1* | 3/2021 | Weinlich ................. | G01S 13/87 |

* cited by examiner

*Primary Examiner* — Marcus E Windrich
(74) *Attorney, Agent, or Firm* — Norton Rose Fulbright US LLP; Gerard Messina

(57) ABSTRACT

A method for operating a first radar sub-sensor and a second radar sub-sensor, in particular in a motor vehicle, the first radar sub-sensor being supplied with voltage by a first switching controller, and the second radar sub-sensor being supplied with voltage by a second switching controller, and the method includes the following steps: Operating the first switching controller at a first switching frequency; and operating the second switching controller at a second switching frequency, the first switching frequency differing from the second switching frequency.

8 Claims, 2 Drawing Sheets

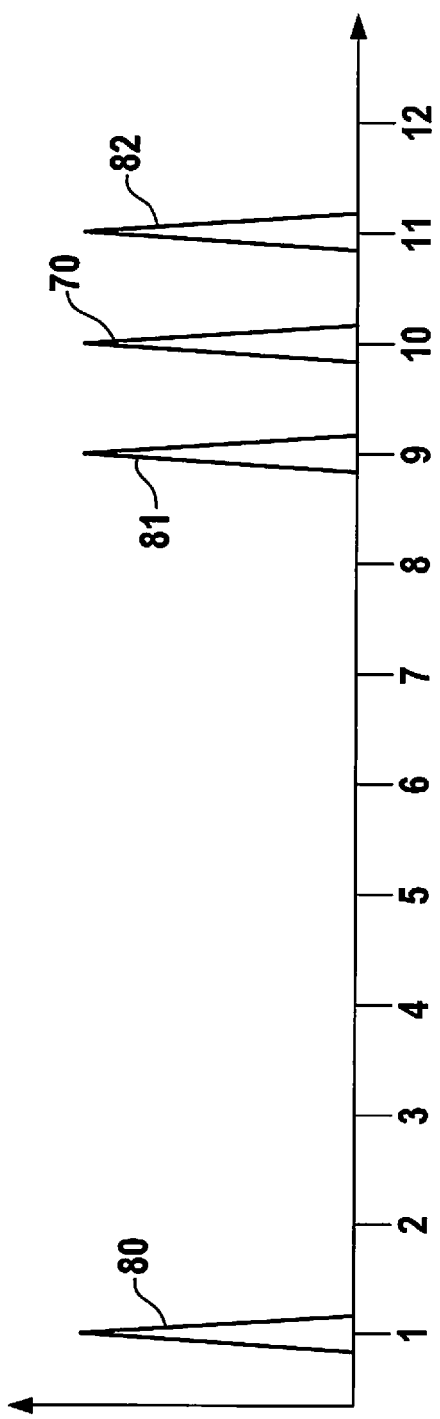
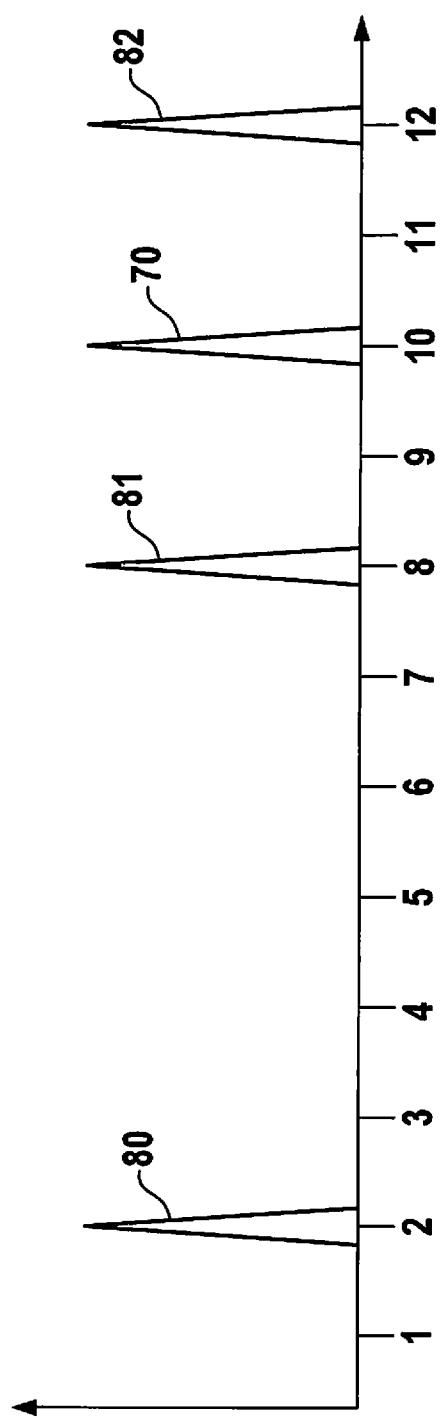

METHOD FOR OPERATING A FIRST RADAR SUB-SENSOR AND A SECOND RADAR SUB-SENSOR, AND RADAR SENSOR SYSTEM INCLUDING A FIRST RADAR SUB-SENSOR AND A SECOND RADAR SUB-SENSOR

BACKGROUND INFORMATION

The present application claims the benefit under 35 U.S.C. § 119 of German Patent Application No. DE 102018206532.2 filed on Apr. 27, 2018, which is expressly incorporated herein by reference it its entirety.

FIELD

The present invention relates to a method for operating a first radar sub-sensor and a second radar sub-sensor, and to a radar sensor system which includes a first radar sub-sensor and a second radar sub-sensor.

BACKGROUND INFORMATION

Radar sensors are currently installed in many motor vehicles. For example, the radar sensors can determine the distance between one motor vehicle and another motor vehicle located in front of said motor vehicle and/or the velocity of the motor vehicle. In addition, the radar sensors can examine and detect the environment of the motor vehicle.

The motor vehicles often have more than one radar sensor. A problem in the conventional radar sensors in motor vehicles is that the switching frequency at which a switching controller for the supply of the radar sensors is operated in a motor vehicle may lead to interference signals in the radar signals. The interference signals could result in incorrect assumptions about the environment of the motor vehicle inasmuch as the interference signals could be interpreted as reflections of (supposedly present) objects in the environment of the motor vehicle (also known as ghost targets).

SUMMARY

Specific example embodiments of the present invention may advantageously provide a method and a system by which, or in which, a plurality of radar sub-sensors is able to be operated and interference signals may be efficiently suppressed.

According to a first aspect of the present invention, a method for operating a first radar sub-sensor and a second radar sub-sensor, in particular in a motor vehicle, is provided, the first radar sub-sensor being supplied with voltage by a first switching controller and the second radar sub-sensor being supplied with voltage by a second switching controller, and the present method includes the following steps: Operating the first switching controller at a first switching frequency; and operating the second switching controller at a second switching frequency, the first switching frequency differing from the second switching frequency.

One advantage of this is that interference signals that are created by the respective switching controller are technically easily identifiable because the interference signals occur at frequencies that differ from one another. As a result, the environment, e.g., the presence of objects in the environment of the vehicle, the velocity and/or the distance of objects from the vehicle, is able to be detected in an especially reliable manner with the aid of the two radar sub-sensors. More specifically, additional ghost targets caused by the switching controller principle, are able to be effectively detected.

According to a second aspect of the present invention, a radar sensor system is provided which includes a first radar sub-sensor, a second radar sub-sensor, a first switching controller for the supply of voltage to the first radar sub-sensor, and a second switching controller for the supply of voltage to the second radar sub-sensor, the first switching controller being operable at a first switching frequency and the second switching controller being operable at a second switching frequency, the first switching frequency differing from the second switching frequency.

This offers the advantage that interference signals generated by the switching controllers are able to be identified in a technically uncomplicated manner with the aid of the radar sensor system, because the interference signals occur at frequencies that differ from one another. Thus, the environment, e.g., the presence of objects in the environment of the vehicle, the velocity, and/or the distance of objects from the vehicle, is able to be detected in a particularly reliable manner with the aid of the radar sensor system. More specifically, additional ghost targets caused by the switching controller principle are able to be effectively detected and/or suppressed.

Ideas in connection with specific embodiments of the present invention may be considered to be based on, among others, the ideas and realizations described in the following text.

According to one specific embodiment of the present method, received signals from the radar sub-sensors are subdivided into a plurality of frequency ranges, and the difference between the first switching frequency and the second switching frequency is such that the first switching frequency lies in a first frequency range of the frequency ranges and the second switching frequency lies in a second frequency range of the frequency ranges, which differs from the first frequency range. This makes it possible to detect the interference signals in a technically especially uncomplicated and rapid manner.

According to one specific embodiment of the present method, a first radar signal of a first range is received by the first radar sub-sensor, and a second radar signal of a second range, which at least partially overlaps with the first range, is received by the second radar sub-sensor, a newly calculated signal being generated from the first radar signal and the second radar signal, and the newly calculated signal having a measured value only in frequency ranges in which both the first radar signal and the second radar signal have a measured value. This is advantageous insofar as the interference signals are particularly easy to detect during the receiving with the aid of the two radar sub-sensors, since the interference signals occur or are present in different frequency ranges (also called bins).

According to one specific embodiment of the present method, a first radar signal is initially transmitted using the first radar sub-sensor, and a second radar signal is then emitted using the second radar sub-sensor, and one frequency or multiple frequencies that is/are not in agreement, and in particular is/are unequal to a carrier frequency of the radar sub-sensors, may be detected as interference frequencies during the transmission by the first radar sub-sensor and the second radar sub-sensor. This offers the advantage that the interference signals are detectable in a technically particularly simple manner during the transmission of radar signals using the two radar sub-sensors, the reason being that the interference signals, which occur in the evaluated spectrum in what is termed side lines, exhibit a temporal offset from one another at different frequencies. The first radar signal and the second radar signal may have an identical frequency swing.

According to one specific embodiment of the present invention, the first switching frequency and the second switching frequency are derived from a shared clock source. This allows the present method to be carried out in a technically even simpler and particularly cost-effective manner.

According to one specific embodiment of the present invention, the first switching frequency and/or the second switching frequency is/are varied over time. One advantage of this is that the interference signals may be identified as interference signals even more easily, for instance because the differentiation between reflections of actually existing objects and interference signals is able to be carried out in a more reliable manner.

According to one specific embodiment of the radar sensor system, received signals of the radar sub-sensors are subdivided into a plurality of frequency ranges, and the difference between the first switching frequency and the second switching frequency is such that the first switching frequency lies in a first frequency range of the frequency ranges and the second switching frequency lies in a second frequency range of the frequency ranges, which differs from the first frequency range. In this way, the interference signals are detectable in a technically especially simple and rapid manner.

According to one specific embodiment of the radar sensor system, the radar sensor system furthermore has a clock source, and both the first switching frequency and the second switching frequency are derived from the clock source. This makes it possible to develop the radar sensor system in a technically particularly simple manner.

According to one specific embodiment of the radar sensor system, the radar sensor system also includes an analysis device; the analysis device is developed to generate a newly calculated signal from the received signals of the first radar sub-sensor and the second radar sub-sensor in order to cancel interference signals to the effect that the newly calculated signal has a measured value only in frequency ranges in which both the first radar signal and the second radar signal have a measured value. This makes it possible in a technically simple manner to generate the newly calculated signal in which only few or even no interference signals are present any longer. Thus, the newly calculated signal represents the environment that was detected by the radar sub-sensors in a particularly reliable manner. More specifically, ghost targets caused by the switching controller principle are effectively identifiable.

A measured value may particularly be a measured value that is not equal to zero.

It is pointed out that a few of the possible features and advantages of the present invention have been described here with reference to different specific embodiments of the present method for operating a first radar sub-sensor and a second radar sub-sensor or the radar sensor system including a first radar sub-sensor and a second radar sub-sensor. One skilled in the art will understand that the features are able to be suitably combined, adapted or exchanged in order to arrive at further specific embodiments of the present invention.

BRIEF DESCRIPTION OF THE DRAWINGS

Below, specific embodiments of the present invention are described with reference to the figures, and neither the figures nor the description are to be interpreted as a limitation of the present invention.

FIG. 2 shows a diagram of data received with the aid of the first radar sub-sensor of the radar sensor system from FIG. 1.

FIG. 3 shows a diagram of data received with the aid of the second radar sub-sensor of the radar sensor system from FIG. 1.

Figure 1:
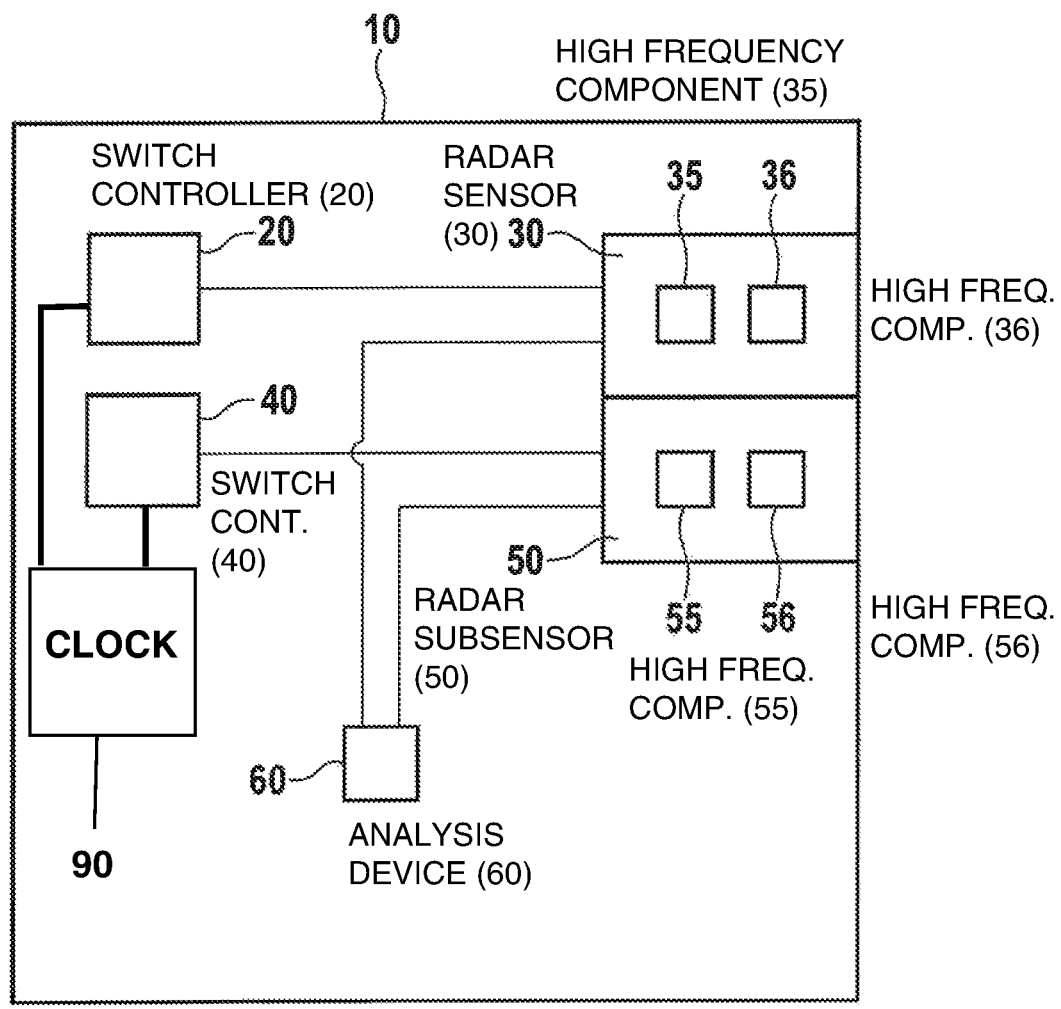
FIG. 1 shows a schematic view of a specific embodiment of the radar sensor system according to the present invention.

The figures are merely schematic and not true to scale. Matching reference numerals in the figures denote identical features or features that have the same effect.

DETAILED DESCRIPTION OF EXAMPLE EMBODIMENTS

FIG. 1 shows a schematic view of a specific embodiment of radar sensor system 10 according to the present invention. Radar sensor system 10 includes a first radar sub-sensor 30 and a second radar sub-sensor 50. First radar sub-sensor 30 includes two first high-frequency components 35, 36. Second radar sub-sensor 50 includes two second high-frequency components 55, 56.

The two radar sub-sensors 30, 50 may be sub-sensors of a larger radar sensor. For example, the two radar sub-sensors 30, 50 are situated on a shared circuit board. However, it is also possible that radar sub-sensors 30, 50 are two radar sensors which are situated on different circuit boards.

In addition, radar sensor system 10 includes a first switching controller 20 and a second switching controller 40. Moreover, radar sensor system 10 includes an analysis device 60, which is able to receive signals from the two radar sub-sensors 30, 50 and possibly from switching controllers 20, 40.

Switching controllers 20, 40 supply voltage to the two radar sub-sensors 30, 50. First switching controller 20 supplies voltage to first radar sub-sensor 30. Second switching controller 40 supplies voltage to second radar sub-sensor 50.

First switching controller 20 and/or second switching controller 40 may be buck controllers or step-down controllers. Switching controllers 20, 40, for example, may have 12V as the input voltage and 5V as the output voltage.

First switching controller 20 is operated or switched at a first switching frequency. Second switching controller 40 is operated or switched at a second switching frequency.

The two switching frequencies differ from each other, i.e. they have values that differ from each other. For example, first switching controller 20 is operated at a switching frequency of 1.8 MHz and second switching controller 40 is operated at a switching frequency of 1.7 MHz, or vice versa.

A radar signal emitted by respective radar sub-sensor 30, 50 has a predefined frequency bandwidth. The received signal or baseband receive signal received by radar sub-sensors 30, 50 is subdivided or split up into a plurality of frequency ranges, e.g., 100 or 10.

FIG. 2 shows a diagram of data received with the aid of first radar sub-sensor 30 of radar sensor system 10 of FIG. 1.

FIG. 3 shows a diagram of data received with the aid of second radar sub-sensor 50 of radar sensor system 10 of FIG. 1. The received data are reflection data, in particular.

The x-axis in FIGS. 2 and 3 indicates the respective frequency range, and lower numbers indicate a lower frequency and higher numbers indicate a higher frequency. The frequency ranges are disjunctive and directly abut each other.

The y-axis in FIGS. 2 and 3 indicates the strength of the respective measured value. The magnitude of the measured values in FIG. 2 and FIG. 3 are of equal size. However, this is only for illustrative purposes. Target signal 70, i.e., the signal or the measured value of an actually present target or object, normally has a considerably higher or stronger measured value than interference signals 80, 81, 82. Interference signals 80, 81, 82 or the measured values of interference signals 80, 81, 82 usually have a deviation of −30 dB, for example, compared to target signal 70 or the measured value of target signal 70.

First radar sub-sensor 30, whose received signal can be seen in FIG. 2, is operated or supplied with voltage by first switching controller 20, first switching controller 20 being driven or actuated using the first switching frequency, which lies in frequency range 1. First radar sensor 30 therefore has an interference signal 80 in frequency range 1.

The object or target that is actually present and generates a target signal 70 in FIG. 2, is measured or detected in frequency range 10. In addition, interference signals 81, 82 or measured values occur around target signal 70, i.e. at a distance from the frequency range of target signal 70, the distance corresponding to the frequency range in which the frequency at which first switching controller 20 is operated lies.

This means that the first switching frequency lies in frequency range 1, that an interference signal 81, 82 or a measured value of interference signal 81, 82 occurs in frequency range 9 (=10−1) and in frequency range 11 (=10+1).

Second radar sub-sensor 50, whose received signal can be seen in FIG. 3, is supplied with voltage by second switching controller 40, second switching controller 40 being driven or actuated using a second switching frequency that differs from the first switching frequency. The second switching frequency has a frequency that lies in frequency range 2.

The target or object is the same, which means that target signal 70 lies in frequency range 10 again. As described above, interference signals 81, 82 or the measured values of interference signals 81, 82, occur at a distance from the frequency range of target signal 70 in which the second switching frequency lies. This means that, because the second switching frequency lies in frequency range 2, interference signals 81, 82 occur in frequency ranges 8 (=10−2) and 12 (=10+2).

Through an analysis of the received signals from first radar sub-sensor 30 and second radar sub-sensor 50 and the determination of the frequency ranges in which a measured value is present in each case, e.g., with the aid of an analysis device 60, interference signals 80, 81, 82 are easy to detect and remove. It may therefore be easily determined that the only target or object lies in frequency range 10.

The newly calculated signal, which is generated by analysis device 60 from the data of first radar sub-sensor 30 and second radar sub-sensor 50, for instance, may have a measured value (unequal to zero) only in the particular frequency ranges in which both the first radar sub-sensor 30 and the second radar sub-sensor 50 measures or detects a measured value. In the process, it is particularly also possible to consider the strength of the respective measured value and, for example, to consider only frequency ranges whose measured values lie above a minimum threshold value.

The difference between the first switching frequency and the second switching frequency is at least such that the switching frequencies lie in different frequency ranges (also known as bins) of radar sub-sensors 30, 50.

The first switching frequency and/or the second switching frequency may be varied over time. This makes it possible to obtain further information from the received signals or the data of radar sub-sensors 30, 50.

The range that is monitored or detected by first radar sub-sensor 30 and second radar sub-sensor 50 overlaps at least partially and in particular completely, so that the same object or target is detected by both radar sub-sensors 30, 50.

Interference signals 80, 81, 82 are also able to be detected during a transmission with the aid of the two radar sub-sensors 30, 50. Toward this end, first radar sub-sensor 30 initially emits a radar signal and then a radar signal is emitted by second radar sub-sensor 50. Interference signals 80, 81, 82 now have different frequencies on or in the transmitted signals of the two radar sub-sensors 30, 50, in particular different frequencies that lie in different frequency ranges of respective radar sub-sensors 30, 50.

First switching controller 20 and second switching controller 40 may be supplied by a common clock source 90.

Since it is at least partly and in particular completely possible to use the same digital lines for the supply of the first switching frequency to first switching controller 20 and for the supply of the second switching frequency to second switching controller 40, radar sensor system 10 may be developed in a particularly cost-effective manner.

For example, radar sensor system 10 may be used in a motor vehicle such as a car, a motorcycle, a bus, a ship and/or a truck. In particular, radar sensor system 10 may be used for the highly automated driving or driverless driving.

In closing, it should be mentioned that the expressions such as "have", "includes", etc. do not exclude other elements or steps, and terms such as "a" or "an" do not exclude a plurality. Reference numerals in the claims are not to be interpreted as a limitation.

What is claimed is:
1. A method for operating a first radar sub-sensor and a second radar sub-sensor of a radar sensor system in a motor vehicle, the method comprising:
  operating a first switching controller of the radar sensor system at a first switching frequency, wherein the first radar sub-sensor is supplied with voltage by the first switching controller; and
  operating a second switching controller of the radar sensor system at a second switching frequency, wherein the second radar sub-sensor is supplied with voltage by the second switching controller; and
  generating a newly calculated signal from the received signals of the first radar sub-sensor and the second radar sub-sensor for a cancelation of interference signals such that the newly calculated signal has a measured value only in frequency ranges in which both the first radar signal and the second radar signal have a measured value;
  wherein the first switching frequency differs from the second switching frequency, and
  wherein the first switching frequency and the second frequency are derived from a clock source in the radar sensor system, and wherein the interference signals are detectable during a transmission with the two radar sub-sensors, wherein the first radar sub-sensor initially emits a radar signal and then a radar signal is emitted by the second radar sub-sensor, so that the interference signals have different frequencies on or in the transmitted signals of the two radar sub-sensors, and wherein different frequencies lie in different frequency ranges of the respective radar sub-sensors, and wherein it is determined that a target or object lies in the frequency range.

2. The method as recited in claim 1, wherein received signals of the first radar sub-sensor and the second radar sub-sensor are subdivided into a plurality of frequency ranges, and a difference between the first switching frequency and the second switching frequency is so great that the first switching frequency lies in a first frequency range of the frequency ranges and the second switching frequency lies in a second frequency range of the frequency ranges that differs from the first frequency range.

3. The method as recited in claim 1, wherein a first radar signal of a first range is received with the first radar sub-sensor, and a second radar signal of a second range, which at least partially overlaps with the first range, is received with the second radar sub-sensor, and a newly calculated signal is generated from the first radar signal and the second radar signal, the newly calculated signal having a measured value only in frequency ranges in which the first radar signal and the second radar signal have a measured value.

4. The method as recited in claim 1, wherein a first radar signal is initially output with the first radar sub-sensor, and then a second radar signal is output with the second radar sub-sensor, and at least one frequency that is not in agreement, which is unequal to a carrier frequency of the first radar sub-sensor and the second radar sub-sensor, is detected as an interference frequency during transmission of the first radar sub-sensor and the second radar sub-sensor.

5. The method as recited in claim 1, wherein the clock source is a shared clock source.

6. The method as recited in claim 1, wherein the first switching frequency and/or the second switching frequency is varied over time.

7. A radar sensor system, comprising:
a first radar sub-sensor;
a second radar sub-sensor;
a first switching controller to supply voltage to the first radar sub-sensor;
a second switching controller to supply voltage to the second radar sub-sensor;
an analysis device to generate a newly calculated signal from the received signals of the first radar sub-sensor and the second radar sub-sensor for a cancelation of interference signals such that the newly calculated signal has a measured value only in frequency ranges in which both the first radar signal and the second radar signal have a measured value; and
a clock source;
wherein the first switching controller is operable at a first switching frequency, and the second switching controller is operable at a second switching frequency, and
wherein the first switching frequency differs from the second switching frequency,
wherein the first switching frequency and the second frequency are derived from the clock source of the radar sensor system,
wherein the interference signals are detectable during a transmission with the two radar sub-sensors, wherein the first radar sub-sensor initially emits a radar signal and then a radar signal is emitted by the second radar sub-sensor, so that the interference signals have different frequencies on or in the transmitted signals of the two radar sub-sensors, and wherein different frequencies lie in different frequency ranges of the respective radar sub-sensors, and
wherein it is determined that a target or object lies in the frequency range.

8. The radar sensor system as recited in claim 7, wherein received signals of the first radar sub-sensor and the second radar sub-sensor are subdivided into a plurality of frequency ranges in each case, and a difference between the first switching frequency and the second switching frequency is such that the first switching frequency lies in a first frequency range of the frequency ranges, and the second switching frequency lies in a second frequency range of the frequency ranges that differs from the first frequency range.

* * * * *